(12) United States Patent
Sodhi

(10) Patent No.: US 8,613,319 B2
(45) Date of Patent: Dec. 24, 2013

(54) LOST-CIRCULATION MATERIAL MADE FROM A RECYCLED MATERIAL CONTAINING ASPHALT

(75) Inventor: Thomas Singh Sodhi, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 196 days.

(21) Appl. No.: 13/267,939

(22) Filed: Oct. 7, 2011

(65) Prior Publication Data

US 2013/0087330 A1    Apr. 11, 2013

(51) Int. Cl.
| | |
|---|---|
| *E21B 43/22* | (2006.01) |
| *E21B 33/13* | (2006.01) |
| *C09K 8/04* | (2006.01) |
| *C09K 8/50* | (2006.01) |

(52) U.S. Cl.
USPC ........ 166/279; 166/285; 166/300; 166/305.1; 175/72; 507/126; 507/232

(58) Field of Classification Search
None
See application file for complete search history.

(56) References Cited

U.S. PATENT DOCUMENTS

| | | | |
|---|---|---|---|
| 3,042,608 | A | 7/1962 | Morris |
| 6,508,306 | B1 | 1/2003 | Reddy et al. |
| 6,861,392 | B2 | 3/2005 | Shaarpour |
| 6,881,708 | B2 | 4/2005 | Reddy et al. |
| 6,902,002 | B1 | 6/2005 | Chatterji et al. |
| 7,055,603 | B2 | 6/2006 | Caveny et al. |
| 7,066,285 | B2 | 6/2006 | Shaarpour |
| 7,086,466 | B2 | 8/2006 | Roddy |
| 7,229,492 | B2 | 6/2007 | Chatterji et al. |
| 7,284,611 | B2 | 10/2007 | Reddy et al. |
| 7,297,208 | B2 | 11/2007 | Caveny et al. |
| 7,534,744 | B2 | 5/2009 | Shaarpour |
| 7,560,419 | B2 | 7/2009 | Fang et al. |
| 7,612,021 | B2 | 11/2009 | Chatterji et al. |
| 7,776,797 | B2 | 8/2010 | Allin et al. |
| 2008/0196628 | A1 | 8/2008 | Santra et al. |
| 2013/0143777 | A1 * | 6/2013 | Wang ........................... 507/204 |

OTHER PUBLICATIONS

White, Lost-Circulation Materials and Their Evaluation, 352-59.
Howard, An Analysis and the Control of Lost Circulation, Petroleum Transactions Aime, 1951, 192, 171-82.
Kumar et al, Wellbore Strengthening: The Less-Studied Properties of Lost-Circulation Materials, 2010, Society of Petroleum Engineers 133484, 1-13.
Smith, Cementing, 1990, 1-5.
FlexPlug Service, Baroid Fluid Services, 2008, 1-4.
Stop-Frac, Baroid Fluid Services, 2005, 1-2.
Hydro-Plug Lost Circulation Plug, Baroid Fluid Services, 2008, 1-2.
EZ-Plug Lost Circulation Material, Baroid Fluid Service, 2005, 1.
Barofibre Lost Circulation and Seepage, Baroid Fluid Services, 2007, 1-2.
Fuse-It, Baroid Fluid Services, 2006, 1-2.
Wellbore Stress Management Service, Baroid Fluid Services, 2006, 1-2.
Engineered WellSET Treatment Service Helps Prevent Lost Circulation by Strengthening the Wellbore, Baroid Fluid Services, 2007, 1-2.
Duo-Squeeze H, Baroid Fluid Services, 2008, 1-2.
Steelseal, Wellbore Stress Management, 2010, 1-2.

* cited by examiner

*Primary Examiner* — Zakiya W Bates
(74) *Attorney, Agent, or Firm* — Craig W. Roddy; Sheri Higgins Law; Sheri Higgins

(57) ABSTRACT

A composition comprises: a treatment fluid comprising a lost-circulation material, wherein the lost-circulation material comprises asphalt, and wherein the lost-circulation material has a median particle size in the range from about 0.001 millimeters to about 25.4 millimeters. According to another embodiment, the composition comprises: a treatment fluid comprising a lost-circulation material, wherein the lost-circulation material comprises asphalt, and wherein the median particle size and the concentration of the lost-circulation material is selected such that the treatment fluid has a sealing pressure of at least 30 psi (0.2 MPa). A method of eliminating or reducing lost circulation from a well comprises: introducing the treatment fluid into at least a portion of the well.

25 Claims, No Drawings

LOST-CIRCULATION MATERIAL MADE FROM A RECYCLED MATERIAL CONTAINING ASPHALT

TECHNICAL FIELD

A treatment fluid containing a lost-circulation material and methods of use are provided. In certain embodiments, the lost-circulation material is made from a recycled material. In some embodiments, the recycled material includes asphalt.

SUMMARY

According to an embodiment, a method of eliminating or reducing lost circulation from a well comprises: introducing a treatment fluid into at least a portion of the well, wherein the treatment fluid comprises: a lost-circulation material, wherein the lost-circulation material comprises asphalt, and wherein the lost-circulation material has a median particle size in the range from about 0.001 millimeters to about 25.4 millimeters.

According to another embodiment, a method of eliminating or reducing lost circulation from a well comprises: introducing a treatment fluid into at least a portion of the well, wherein the treatment fluid comprises: a lost-circulation material, wherein the lost-circulation material comprises asphalt, and wherein the median particle size and the concentration of the lost-circulation material is selected such that the treatment fluid has a sealing pressure of at least 30 psi (MPa).

According to another embodiment, a composition comprises: a treatment fluid comprising a lost-circulation material, wherein the lost-circulation material comprises asphalt, and wherein the lost-circulation material has a median particle size in the range from about 0.001 millimeters to about 25.4 millimeters.

DETAILED DESCRIPTION

As used herein, the words "comprise," "have," "include," and all grammatical variations thereof are each intended to have an open, non-limiting meaning that does not exclude additional elements or steps.

As used herein, a "fluid" is a substance having a continuous phase that can flow and conform to the outline of its container when the substance is tested at a temperature of 71° F. (22° C.) and a pressure of one atmosphere "atm" (0.1 megapascals "MPa"). A fluid can be a liquid or gas. A homogenous fluid has only one phase; whereas a heterogeneous fluid has more than one distinct phase. A colloid is an example of a heterogeneous fluid. A colloid can be: a slurry, which includes a continuous liquid phase and undissolved solid particles as the dispersed phase; an emulsion, which includes a continuous liquid phase and at least one dispersed phase of immiscible liquid droplets; or a foam, which includes a continuous liquid phase and a gas as the dispersed phase.

Oil and gas hydrocarbons are naturally occurring in some subterranean formations. A subterranean formation containing oil or gas is sometimes referred to as a reservoir. A reservoir may be located under land or off shore. In order to produce oil or gas, a wellbore is drilled into a reservoir or adjacent to a reservoir.

A well can include, without limitation, an oil, gas, water, or injection well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within about 100 feet of the wellbore. As used herein, "into a well" means and includes into any portion of the well, including into the wellbore or into the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore which can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

A wellbore is formed using a drill bit. A drill string can be used to aid the drill bit in drilling through the subterranean formation to form the wellbore. The drill string can include a drilling pipe. During drilling operations, a drilling fluid, sometimes referred to as a drilling mud, may be circulated downwardly through the drilling pipe, and back up the annulus between the wellbore and the outside of the drilling pipe. The drilling fluid is generally a slurry or an emulsion and contains a liquid continuous phase. The drilling fluid performs various functions, such as cooling the drill bit, maintaining the desired pressure in the well, and carrying drill cuttings upwardly through the annulus between the wellbore and the drilling pipe.

During well completion, it is common to introduce a cement composition into a portion of an annulus in a wellbore. For example, in a cased-hole wellbore, a cement composition can be placed into and allowed to set in the annulus between the wellbore and the casing in order to stabilize and secure the casing in the wellbore. By cementing the casing in the wellbore, fluids are prevented from flowing into the annulus. Consequently, oil or gas can be produced in a controlled manner by directing the flow of oil or gas through the casing and into the wellhead. Cement compositions can also be used in primary or secondary cementing operations, well-plugging, or gravel packing operations. As used herein, a "cement composition" is a mixture of at least cement and water. A cement composition can include additives. As used herein, the term "cement" means an initially dry substance that develops compressive strength or sets in the presence of water. A cement composition is generally a slurry in which the water comprises the continuous liquid phase of the slurry and the cement, and other undissolved solids make up the dispersed phase of the slurry.

A treatment fluid, such as a drilling fluid or cement composition, that contains a liquid continuous phase can create lost circulation. Lost circulation means that an undesirable portion of the liquid continuous phase of a fluid flows into the subterranean formation instead of returning to the surface. In an ideal drilling situation, the drilling fluid is pumped through a tubing string and returns to the surface via an annulus. The drilling fluid is generally pumped at or above the hydrostatic pressure of the subterranean formation. The pressure of the drilling fluid, being greater than or equal to the pressure of the formation, helps prevent the formation from caving into the newly-formed wellbore, and it also helps prevent the oil or gas from prematurely entering the wellbore. In an ideal cementing operation, the cement composition is placed in the portion of the well to be cemented. The cement composition remains in the portion of the well until the composition eventually sets.

However, during lost circulation of a drilling fluid, the liquid continuous phase of the fluid can enter the subterranean formation. The liquid can flow into the formation, for example, via fractures or fissures in the formation. If a sufficient amount of the liquid flows into the formation, then the total amount of pressure exerted on the formation by the fluid can decrease substantially. This decreased pressure can allow formation fluids, such as oil or gas, to prematurely enter the wellbore. The uncontrolled release of formation fluids is called a blow out. Another potential consequence to lost circulation for a drilling fluid is dry drilling. Dry drilling can damage the drill bit or the drill string, among other things.

During lost circulation of a cement composition, the liquid continuous phase of the composition can enter the subterranean formation. As the cement in the composition requires water to hydrate and is what ultimately allows the composition to set, the loss of water to the formation can cause severe consequences to the cementing operation. For example, the cement composition may never set. If this occurs, a new cementing job will have to be performed. Removing the unset cement composition and running a new cement job can cost time and money.

In order to overcome the problems associated with lost circulation, materials, commonly called a lost-circulation material ("LCM"), have been used. LCMs are generally non-swellable, granular-shaped substances. Generally, the LCM is included in the treatment fluid. As the treatment fluid is placed into the well, the LCM can eliminate or lessen the amount of fluid entering the formation. Traditionally, the particles of the LCM can build upon each other and form a bridge over highly-permeable areas of the formation. For example, if a fracture is present in the formation, then the particles of the LCM can form a non-porous bridge or layer over the fracture entrance near the wall of the wellbore. The bridge or layer can eliminate or reduce the amount of liquid entering the formation via the wellbore.

Recently, there has been a decrease in the availability of LCMs. There could be several reasons for the decrease in supply, including a decrease of raw materials used to manufacture LCMs, an increased cost for obtaining the raw materials, a decrease in the effectiveness of the LCM, or other reasons not listed. However, the demand for LCMs has not greatly diminished. Therefore, there is a need for an LCM that is low-cost, effective, and can be made from a readily-available supply of raw materials.

It has been discovered that recycled roof shingles can be used as an LCM for wellbore treatment fluids. According to some reports, there is an estimated 11 million tons of waste asphalt roof shingles generated in the United States (U.S.) each year. The majority of the waste shingles are not recycled and add to land fill problems across the U.S. Some programs recycle the shingles, for example, as a filler in the creation of asphalt roads. However, due to the large amount of waste shingles generated each year, there is an abundant supply of waste shingles that can be recycled as an LCM.

A common composition and concentration of waste asphalt shingles is as follows: asphalt cement at 19 to 36% by weight; mineral fillers (e.g., limestone, silica, dolomite, etc.) at 8 to 40% by weight; mineral granules (e.g., sand-sized ceramic-coated natural rock) at 20 to 38% by weight; and felt backing at 2 to 15% by weight. The felt backing is generally either an organic felt made with cellulose or a fiberglass felt.

In order to function as an LCM, the particle size of the material can be adjusted to meet the specific conditions of the well. There have been several models developed to help determine the optimum particle size distribution of the material. The optimum particle size distribution is the size wherein the minimum amount of liquid is lost to the formation. One example of such a method is the Halliburton method. According to this method, the median particle size is selected to be equal to the estimated fracture width. In this manner, a sufficient amount of particles both, larger and smaller than the median size, are present to create the most effective bridge or seal.

Some of the advantages to using recycled roof shingles as an LCM include: there is an abundant supply of shingles; almost every state and major city has a supply of the shingles, as such the cost of the shingles can be relatively low due to decreased transportation costs; and the shingles are an effective LCM.

If any test (e.g., flow loop or compressive strength) requires the step of mixing, then the substance is mixed according to the following procedures. For a cement composition, the water is added to a mixing container and the container is then placed on a mixer base. The motor of the base is then turned on and maintained at 4,000 revolutions per minute (rpm). The cement and any other ingredients are added to the container at a uniform rate in not more than 15 seconds (s). After all the cement and any other ingredients have been added to the water in the container, a cover is then placed on the container, and the cement composition is mixed at 12,000 rpm (+/−500 rpm) for 35 s (+/−1 s).

It is also to be understood that if any test (e.g., flow loop or compressive strength) requires the test be performed at a specified temperature and possibly a specified pressure, then the temperature and pressure of the substance is ramped up to the specified temperature and pressure after being mixed at ambient temperature and pressure. For example, the substance can be mixed at 71° F. (22° C.) and 1 atm (0.1 MPa) and then placed into the testing apparatus and the temperature of the substance can be ramped up to the specified temperature. As used herein, the rate of ramping up the temperature is generally in the range of not more than about 3° F./min to about 5° F./min (about 1.67° C./min to about 2.78° C./min). After the substance is ramped up to the specified temperature and possibly pressure, the substance is maintained at that temperature and pressure for the duration of the testing.

As used herein, the "flow loop" test is conducted as follows. The substance is mixed. The substance is then flowed through a hollow, tubular loop fitted with a slot of a specified width and or gap. As used herein, the "sealing time" is the time it takes for the slurry to stop flowing through the slot. When the slurry stops flowing through the slot, the pressure on the slot is gradually increased. It is to be understood, that the capability of the instrument may not exceed a pressure of 100 psi (0.7 MPa). Moreover, even though an instrument may be capable of placing a pressure of greater than 100 psi (0.7 MPa) on the seal, the results may not be reliable. Therefore, the specified pressure is meant to take into account the capabilities of the instrument as well as the reliability of the results. As long as the seal does not break, the pressure is then held at that pressure for a total of 15 seconds (s). As used herein, the "sealing pressure" is the pressure at which the slurry maintains a seal and does not allow fluid to flow through the slot for a time period of at least 15 s. It is to be understood that the "sealing pressure" may be higher than the stated pressure. For example, if the instrument is only capable of applying 100 psi to the seal, then the actual sealing pressure may be much higher than 100 psi, but it is not possible to test for the maximum pressure the seal can withstand without breaking. As a result, the "sealing pressure" is the maximum pressure at which the seal does not break within the confines of the testing instrument's limits.

A cement composition can develop compressive strength. Cement composition compressive strengths can vary and can exceed 10,000 psi (69 MPa). As used herein, the "compressive strength" of a cement composition is measured at ambient temperature (about 71° F., about 22° C.) using the destructive method as follows. The substance is mixed. The substance is then cured at a specified temperature until the substance has set. As used herein, the term "set," and all grammatical variations thereof, is intended to mean the process of becoming hard or solid by curing. The set substance is then placed into a compression-testing device, such as a Super L Universal testing machine model 602, available from Tinius Olsen, Horsham in Pennsylvania, USA. The pressure is gradually increased until the substance breaks. The compressive strength is calculated as the force required to break the substance divided by the smallest cross-sectional area in contact with the load-bearing plates of the compression-testing device. The compressive strength is reported in units of pressure, such as pound-force per square inch (psi) or megapascals (MPa).

According to an embodiment, a method of eliminating or reducing lost circulation from a well comprises: introducing a treatment fluid into at least a portion of the well, wherein the treatment fluid comprises: a lost-circulation material, wherein the lost-circulation material comprises asphalt, and wherein the lost-circulation material has a median particle size in the range from about 0.001 millimeters to about 25.4 millimeters.

According to another embodiment, a method of eliminating or reducing lost circulation from a well comprises: introducing a treatment fluid into at least a portion of the well, wherein the treatment fluid comprises: a lost-circulation material, wherein the lost-circulation material comprises asphalt, and wherein the median particle size and the concentration of the lost-circulation material is selected such that the treatment fluid has a sealing pressure of at least 30 psi (MPa).

According to another embodiment, a composition comprises: a treatment fluid comprising a lost-circulation material, wherein the lost-circulation material comprises asphalt, and wherein the lost-circulation material has a median particle size in the range from about 0.001 millimeters to about 25.4 millimeters.

The discussion of preferred embodiments regarding the treatment fluid or any ingredient in the treatment fluid, is intended to apply to the composition embodiments and the method embodiments. Any reference to the unit "gallons" means U.S. gallons.

The treatment fluid can be a colloid. The treatment fluid can contain a liquid. The treatment fluid can include a liquid continuous phase. The liquid can comprise water. The water can be selected from the group consisting of freshwater, brackish water, saltwater, and any combination thereof. Alternatively, the liquid can comprise an oil. As used herein, the term "oil" means a liquid comprising a hydrocarbon when measured at a temperature of 71° F. (21.7° C.) and a pressure of one atmosphere. Examples of oil include, but are not limited to: crude oil; a fractional distillate of crude oil; a fatty derivative of an acid, an ester, an ether, an alcohol, an amine, an amide, or an imide; a saturated hydrocarbon; an unsaturated hydrocarbon; a branched hydrocarbon; a cyclic hydrocarbon; and any combination thereof. Crude oil can be separated into fractional distillates based on the boiling point of the fractions in the crude oil. An example of a suitable fractional distillate of crude oil is diesel oil. The saturated hydrocarbon can be an alkane or paraffin. The paraffin can be an isoalkane (isoparaffin), a linear alkane (paraffin), or a cyclic alkane (cycloparaffin). The unsaturated hydrocarbon can be an alkene, alkyne, or aromatic. The alkene can be an isoalkene, linear alkene, or cyclic alkene. The linear alkene can be a linear alpha olefin or an internal olefin. The liquid continuous phase can also include dissolved substances or undissolved solids.

According to an embodiment, the treatment fluid is an emulsion. According to another embodiment, the treatment fluid is a slurry. The treatment fluid can include a dispersed phase. Preferably, the dispersed phase of the treatment fluid includes the lost-circulation material ("LCM").

The LCM comprises asphalt. As used herein, the term "asphalt," also known as bitumen, means a sticky, black, and highly viscous liquid or semi-solid that is present in most crude petroleums and in some natural deposits. The asphalt can be part of asphalt concrete. As used herein, the term "asphalt concrete" means a mixture of at least asphalt and mineral aggregate. The asphalt can be in a concentration of at least 10% by weight of the LCM. The asphalt can be in a concentration in the range of about 10% to about 70% by weight of the LCM. The asphalt can also be in a concentration in the range of about 15% to about 50% by weight of the LCM. The asphalt can also be in a concentration in the range of about 20% to about 40% by weight of the LCM.

The LCM can further comprise a filler. The filler can be selected from the group consisting of limestone, silica, dolomite, calcium carbonate, talc, mica, feldspar, barites, kaolin, wollastonite, and combinations thereof. The filler can be in a concentration of at least 5% by weight of the LCM. The filler can be in a concentration in the range of about 5% to about 90% by weight of the LCM. The filler can also be in a concentration in the range of about 5% to about 70% by weight of the LCM. The filler can also be in a concentration in the range of about 10% to about 40% by weight of the LCM.

The LCM can further comprise solid aggregates of minerals. The solid aggregates of minerals can be coated with a ceramic material. According to an embodiment, the solid aggregates of minerals have a particle size ranging from 0.0625 mm to 2 mm. The solid aggregates of minerals can be in a concentration of at least 10% by weight of the LCM. The solid aggregates of minerals can be in a concentration in the range of about 10% to about 50%, alternatively about 15% to about 45%, alternatively about 20% to about 40%, by weight of the LCM.

The LCM can further comprise a felt. The felt can be made from cellulose or fiberglass. The felt can be in a concentration in the range of about 2% to 15% by weight of the LCM.

According to an embodiment, the LCM is made from asphalt roofing shingles. The LCM can also be made from reclaimed asphalt roads, felt roof backing, metal composition roof tiles, and old "hot tar" roofs. Preferably, the LCM comes from a recycled product. By way of example, if the LCM is made from asphalt roofing shingles, then old shingles can be collected and then ground to the desired particle size for use as an LCM.

According to an embodiment, the LCM has a median particle size in the range of about 0.001 millimeters (mm) to about 25.4 mm. The LCM can also have a median particle size in the range from about 0.1 mm to about 22 mm, alternatively about 0.7 mm to about 13 mm. According to another embodiment, the median particle size of the LCM is selected such that the treatment fluid has a sealing pressure of at least 30 psi (0.2 MPa). The median particle size of the LCM can also be selected such that the treatment fluid has a sealing pressure of at least 100 psi (0.7 MPa). The median particle size of the LCM can also be selected such that the treatment fluid has a sealing pressure in the range of about 30 to about 100 psi (about 0.2 to about 0.7 MPa), alternatively about 50 to about 80 psi (about 0.3 to about 0.6 MPa). According to another embodiment, the median particle size of the LCM is selected such that the treatment fluid has a sealing pressure at the bottomhole pressure of the well. As used herein, the term "bottomhole" means the portion of the well to be treated.

According to an embodiment, the LCM is in a concentration of at least 0.1% weight by volume (wt/vol) of the treatment fluid. The LCM can be in a concentration in the range of about 0.1% wt/vol to about 30% wt/vol, alternatively about 2% wt/vol to about 25% wt/vol, alternatively about 3.5% wt/vol to about 19% wt/vol of the treatment fluid. According to another embodiment, the concentration of the LCM is selected such that the treatment fluid has a sealing pressure of at least 30 psi (0.2 MPa). The concentration of the LCM can also be selected such that the treatment fluid has a sealing pressure of at least 100 psi (0.7 MPa). The concentration of the LCM can also be selected such that the treatment fluid has a sealing pressure in the range of about 30 to about 100 psi (about 0.2 to about 0.7 MPa), alternatively about 50 to about 80 psi (about 0.3 to about 0.6 MPa). According to another embodiment, the concentration of the LCM is selected such that the treatment fluid has a sealing pressure at the bottomhole pressure of the well.

The LCM can have a specific gravity in the range from about 1.6 to about 2.1, alternatively from about 1.75 to about 2. Preferably, the LCM has a specific gravity in the range from about 1.85 to about 1.9.

The treatment fluid can have a sealing pressure of at least 20 psi (0.1 MPa), alternatively at least 40 psi (0.3 MPa), alternatively at least 100 psi (0.7 MPa). Preferably, the treatment fluid has a sealing pressure at the bottomhole pressure of the well. The treatment fluid can have a sealing time of less than 10 minutes (min.), alternatively less than 5 min., alternatively less than 3 min. The treatment fluid can be any fluid having a liquid continuous phase. The treatment fluid can be any fluid where lost circulation from a well into a subterranean formation might occur. Examples of the treatment fluid include, but are not limited to, a drilling fluid and a cement composition.

If the treatment fluid is a cement composition, then the treatment fluid can develop a compressive strength of at least 1,000 psi (6.9 MPa) at a temperature of 100° F. (37.8° C.). The cement composition treatment fluid can also develop a compressive strength of at least 1,200 psi (8.3 MPa), preferably at least 1,400 psi (9.7 MPa) at a temperature of 100° F. (37.8° C.). According to another embodiment, if the treatment fluid is a cement composition, then the treatment fluid develops a compressive strength of at least 2,500 psi (17.2 MPa) at a temperature of 190° F. (87.8° C.). The cement composition treatment fluid can also develop a compressive strength of at least 2,800 psi (19.3 MPa), preferably at least 3,100 psi (21.4 MPa) at a temperature of 190° F. (87.8° C.). The cement composition treatment fluid can also develop a compressive strength of at least 1,200 psi (8.3 MPa), preferably at least 2,500 psi (17.2 MPa) at the bottomhole temperature of the well.

The method embodiments include the step of introducing the treatment fluid into at least a portion of the well. The step of introducing is for the purpose of at least one of the following: drilling operations; well completion; foam cementing; primary or secondary cementing operations; well-plugging; squeeze cementing; and gravel packing. If the treatment fluid is a cement composition, then the cement composition can be in a pumpable state before and during introduction into the well. In one embodiment, a subterranean formation is penetrated by the well. The well can be, without limitation, an oil, gas, water, or injection well. According to another embodiment, the well includes an annulus. According to this other embodiment, the step of introducing includes introducing the cement composition into a portion of the annulus.

If the treatment fluid is a cement composition, then the method embodiments can further include the step of allowing the cement composition to set. The step of allowing can be after the step of introducing the treatment fluid into the well. The method embodiments can also include the additional steps of perforating, fracturing, or performing an acidizing treatment, after the step of allowing.

The well can have a bottomhole temperature in the range of about 35° F. to about 800° F. (about 1.7° C. to about 426.7° C.).

If the treatment fluid is a cement composition, then the treatment fluid can further include cement. The cement can be Class A cement, Class C cement, Class G cement, Class H cement, fly ash, slag, volcanic ash, and any combination thereof. Preferably, the cement is Class G cement or Class H cement.

The treatment fluid can further include an additive. Examples of an additive include, but are not limited to, a filler, a fluid loss additive, a set retarder, a friction reducer, a strength-retrogression additive, a defoaming agent, a high-density additive, a set accelerator, a mechanical property enhancing additive, a lost-circulation material, a filtration-control additive, a thixotropic additive, a nano-particle, and combinations thereof.

The treatment fluid can include a filler. Suitable examples of fillers include, but are not limited to, fly ash, sand, clays, and vitrified shale. Preferably, the filler is in a concentration in the range of about 5% to about 50% by weight of the cement (bwc).

The treatment fluid can include a fluid loss additive. Suitable examples of commercially-available fluid loss additives include, but are not limited to, HALAD®-23, HALAD®-344, HALAD®-413, and HALAD®-300, marketed by Halliburton Energy Services, Inc. Preferably, the fluid loss additive is in a concentration in the range of about 0.05% to about 10% bwc.

The treatment fluid can include a set retarder. Suitable examples of commercially-available set retarders include, but are not limited to, HR®-4, HR®-5, HR®-6, HR®-12, HR®-20, HR®-25, SCR-100™, and SCR-500™, marketed by Halliburton Energy Services, Inc. Preferably, the set retarder is in a concentration in the range of about 0.05% to about 10% bwc.

The treatment fluid can include a friction reducer. Suitable examples of commercially-available friction reducers include, but are not limited to, CFR-2™, CFR-3™, CFR-5LE™, CFR-6™, and CFR-8™, marketed by Halliburton Energy Services, Inc. Preferably, the friction reducer is in a concentration in the range of about 0.1% to about 10% bwc.

The treatment fluid can include a strength-retrogression additive. Suitable examples of commercially-available strength-retrogression additives include, but are not limited to, SSA-1™ and SSA-2™, marketed by Halliburton Energy Services, Inc. Preferably, the strength-retrogression additive is in a concentration in the range of about 5% to about 50% bwc.

Commercially-available examples of other additives include, but are not limited to, High Dense® No. 3, High Dense® No. 4, Barite™, Micromax™, Silicalite™, Well-Life® 665, WellLife® 809, WellLife® 810, and Channel Seal™ Fluid, marketed by Halliburton Energy Services, Inc.

In one embodiment, the treatment fluid has a density of at least 10 pounds per gallon (ppg) (1.2 kilograms per liter (kg/l)). In another embodiment, the treatment fluid has a density of at least 14 ppg (1.7 kg/1). In another embodiment, the treatment fluid has a density in the range of about 14 to about 20 ppg (about 1.7 to about 2.4 kg/1).

EXAMPLES

To facilitate a better understanding of the preferred embodiments, the following examples of certain aspects of the preferred embodiments are given. The following examples are not the only examples that could be given according to the preferred embodiments and are not intended to limit the scope of the invention.

For the data contained in the following tables, the concentration of any ingredient in a cement composition can be expressed as pounds per sack of cement (abbreviated as "lb/sk") or percent by weight of the cement (abbreviated as "% bwc").

The cement compositions were mixed and tested according to the procedure for the specific test as described in The Detailed Description section above. The compressive strength tests were conducted by curing the sample for 24 hours until set at a temperature of either 100° F. (37.8° C.) or 190° F. (87.8° C.).

Table 1 contains flow loop testing data with a slot size of 2 mm for 4 different cement composition treatment fluids having a density of 14.4 pounds per gallon (1.72 kg/L). Each of the cement compositions contained deionized water at a concentration of 54.33% bwc; Texas Lehigh Class H cement at a concentration of 47 lb/sk; POZMIX® A fly ash filler at a concentration of 37 lb/sk; Bentonite clay at a concentration of 2% bwc; FWCA™ free-water control agent at a concentration of 0.1% bwc; HALAD®-23 fluid loss additive at a concentration of 1% bwc; and D-AIR 3000™ defoamer at a concentration of 0.5% bwc. The cement compositions contained a lost-circulation material of either asphalt shingles or Gilsonite. The asphalt shingles were ground and had a specific gravity of 1.89. The shingles were screened through a #10 ASTM mesh sieve, giving the shingles a particle size no greater than 2 mm. As can be seen in Table 1, the cement compositions containing Gilsonite did not create a seal at least for the first 3 minutes of flowing the slurry through the loop. The composition with the highest concentration of shingles had a much lower sealing time. The next to the sealing pressure indicates that the seal broke at that pressure; however, as soon as the pressure was decreased slightly, the seal re-formed. For composition #3, the seal broke 1 time at 40 psi. For composition #4, the seal broke twice at 40 psi and broke once at 80 psi. This indicates that the shingles would be effective as an LCM at pressures less than 40 psi. Moreover, as the concentration of the shingles is increased, the sealing pressure may also increase.

TABLE 1

| Cement Composition | LCM | Concentration (lb/sk) | Sealing Time (min:s) | Max. Sealing Pressure (psi) |
|---|---|---|---|---|
| 1 | Gilsonite | 3 | None up to 3:00 | — |
| 2 | Gilsonite | 5 | None up to 3:00 | — |
| 3 | Shingles | 3 | 3:10 | 40* (1x) |
| 4 | Shingles | 5 | 1:20 | 40* (2x) & 80* (1x) |

Table 2 contains compressive strength data for several different cement composition treatment fluids having a density of 16.4 lb/gal (1.97 kg/L). Each of the cement compositions contained deionized water and Texas Lehigh Class H cement. Some of the compositions also contained the asphalt shingles lost-circulation material. As can be seen in Table 2, the cement compositions containing the LCM on average exhibited slightly higher compressive strengths compared to the neat cement compositions that did not contain the LCM. This indicates that the addition of the LCM will not decrease, but may actually increase, the compressive strength when used in a cement composition.

TABLE 2

| LCM (lb/sk) | Temperature (° F.) | Compressive Strength (psi) |
|---|---|---|
| — | 100 | 1,529 |
| — | 100 | 1,445 |
| 3 | 100 | 1,428 |
| 3 | 100 | 1,720 |
| — | 190 | 3,180 |
| — | 190 | 3,680 |
| — | 190 | 3,390 |
| 3 | 190 | 3,310 |
| 3 | 190 | 3,410 |
| 3 | 190 | 3,600 |

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of eliminating or reducing lost circulation from a well comprising:
   introducing a treatment fluid into at least a portion of the well, wherein the treatment fluid comprises:
      a lost-circulation material,
         wherein the lost-circulation material comprises asphalt, and wherein the lost-circulation material has a median particle size in the range from about 0.001 millimeters to about 25.4 millimeters, wherein the treatment fluid develops a compressive strength of at least 1,000 psi (6.9 MPa) at a temperature of 100° F. (37.8° C.).

2. The method according to claim 1, wherein the asphalt is part of asphalt concrete.

3. The method according to claim 1, wherein the asphalt is in a concentration in the range of about 10% to about 70% by weight of the lost-circulation material.

4. The method according to claim 1, wherein the lost-circulation material is made from asphalt roofing shingles, reclaimed asphalt roads, felt roof backing, metal composition roof tiles, and old "hot tar" roofs.

5. The method according to claim 1, wherein the lost-circulation material is made from a recycled product.

6. The method according to claim 1, wherein the lost-circulation material has a median particle size in the range from about 0.7 millimeters to about 13 millimeters.

7. The method according to claim 1, wherein the lost-circulation material is in a concentration of at least 0.1% weight by volume of the treatment fluid.

8. The method according to claim 1, wherein the lost-circulation material is in a concentration in the range of about 3.5% to about 19% weight by volume of the treatment fluid.

9. The method according to claim 1, wherein the treatment fluid has a sealing time of less than 5 minutes.

10. The method according to claim 1, wherein the treatment fluid is a drilling fluid.

11. The method according to claim 1, wherein the treatment fluid is a cement composition.

12. The method according to claim 1, wherein the treatment fluid has a sealing pressure of at least 20 psi.

13. The method according to claim 1, wherein the lost-circulation material has a specific gravity in the range from about 1.6 to about 2.1.

14. A method of eliminating or reducing lost circulation from a well comprising:
introducing a treatment fluid into at least a portion of the well, wherein the treatment fluid comprises:
a lost-circulation material,
wherein the lost-circulation material comprises asphalt, and
wherein the median particle size and the concentration of the lost-circulation material is selected such that the treatment fluid has a sealing pressure of at least 30 psi (0.2 MPa),
wherein the treatment fluid develops a compressive strength of at least 1,000 psi (6.9 MPa) at a temperature of 100° F. (37.8° C.).

15. The method according to claim 14, wherein the median particle size and the concentration of the lost-circulation material is selected such that the treatment fluid has a sealing pressure of at least 100 psi (0.7 MPa).

16. The method according to claim 14, wherein the median particle size and the concentration of the lost-circulation material is selected such that the treatment fluid has a sealing pressure in the range of about 30 to about 100 psi (about 0.2 to about 0.7 MPa).

17. The method according to claim 14, wherein the median particle size of the lost-circulation material is selected such that the treatment fluid has a sealing pressure at the bottomhole pressure of the well.

18. The method according to claim 14, wherein the concentration of the lost-circulation material is selected such that the treatment fluid has a sealing pressure at the bottomhole pressure of the well.

19. A composition comprising:
a treatment fluid comprising a lost-circulation material,
wherein the lost-circulation material comprises asphalt, and
wherein the lost-circulation material has a median particle size in the range from about 0.001 millimeters to about 25.4 millimeters,
wherein the treatment fluid develops a compressive strength of at least 1,000 psi (6.9 MPa) at a temperature of 100° F. (37.8° C.).

20. A method of eliminating or reducing lost circulation from a well comprising:
introducing a treatment fluid into at least a portion of the well, wherein the treatment fluid comprises:
a lost-circulation material,
wherein the lost-circulation material comprises asphalt,
wherein the lost-circulation material has a median particle size in the range from about 0.001 millimeters to about 25.4 millimeters, and
wherein the lost-circulation material is made from asphalt roofing shingles, reclaimed asphalt roads, felt roof backing, metal composition roof tiles, and old "hot tar" roofs.

21. A method of eliminating or reducing lost circulation from a well comprising:
introducing a treatment fluid into at least a portion of the well, wherein the treatment fluid comprises:
a lost-circulation material,
wherein the lost-circulation material comprises asphalt,
wherein the lost-circulation material has a median particle size in the range from about 0.001 millimeters to about 25.4 millimeters, and
wherein the lost-circulation material is made from a recycled product.

22. A method of eliminating or reducing lost circulation from a well comprising:
introducing a treatment fluid into at least a portion of the well, wherein the treatment fluid comprises:
a lost-circulation material,
wherein the lost-circulation material comprises asphalt,
wherein the median particle size and the concentration of the lost-circulation material is selected such that the treatment fluid has a sealing pressure of at least 30 psi (0.2 MPa), and
wherein the lost-circulation material is made from asphalt roofing shingles, reclaimed asphalt roads, felt roof backing, metal composition roof tiles, and old "hot tar" roofs.

23. A method of eliminating or reducing lost circulation from a well comprising:
introducing a treatment fluid into at least a portion of the well, wherein the treatment fluid comprises:
a lost-circulation material,
wherein the lost-circulation material comprises asphalt,
wherein the median particle size and the concentration of the lost-circulation material is selected such that the treatment fluid has a sealing pressure of at least 30 psi (0.2 MPa), and wherein the lost-circulation material is made from a recycled product.

24. A composition comprising:

a treatment fluid comprising a lost-circulation material,
wherein the lost-circulation material comprises asphalt,
wherein the lost-circulation material has a median particle size in the range from about 0.001 millimeters to about 25.4 millimeters, and
wherein the lost-circulation material is made from asphalt roofing shingles,
reclaimed asphalt roads, felt roof backing, metal composition roof tiles, and old "hot tar" roofs.

25. A composition comprising:

a treatment fluid comprising a lost-circulation material,
wherein the lost-circulation material comprises asphalt,
wherein the lost-circulation material has a median particle size in the range from about 0.001 millimeters to about 25.4 millimeters, and
wherein the lost-circulation material is made from a recycled product.

* * * * *